United States Patent Office 3,481,896
Patented Dec. 2, 1969

3,481,896
PLASTIC BONDED RODS
John C. Logan, Leicester, Mass., assignor to Norton Company, Worcester, Mass., a corporation of Massachusetts
No Drawing. Filed Aug. 7, 1967, Ser. No. 658,606
Int. Cl. B05b 7/26; C04b 35/00
U.S. Cl. 260—38  3 Claims

ABSTRACT OF THE DISCLOSURE

Rods for flame spraying of refractory oxides are formed by bonding refractory oxide particles with a cross-linked organic polymer. The bond constitutes between 10% and 30% by volume of the finished rod solids and is highly cross-linked so that it does not liquify prior to thermal decomposition in the spraying flame.

BACKGROUND OF THE INVENTION

This invention relates to rods of refractory oxide for use in applying refractory coatings on metal or other surfaces by flame spray methods, including the use of combustion or plasma torch flame-spray guns.

Such rods have been provided by sintering refractory metal oxide, in particulate form, at very high temperatures. Such prior art rods are disclosed in the patents of Neil N. Ault, Nos. 2,876,121, and 2,882,174. The art of producing refractory oxide flame sprayed coatings from such rods is disclosed in U.S. Patent 2,707,691.

An important feature of the sintered rods disclosed in the Ault patents is the residence time of the refractory particles in or adjacent the flame in the spraying equipment. By employing high-fired sintered rods it was found that complete melting of the particles projected onto the surface to be coated was achieved. Thus, hard, fully fused coatings were achieved in contrast to other methods, such as powder spraying.

Because of the expense of the firing operation in producing rods, the use of organic bonding material has been proposed. In the past, rods formed by such bonding have not produced commercially acceptable coatings. The production of coilable wire or rod by the use of organic binders has been suggested for fused metal flame spraying in U.S. Patent 2,570,649. Schoop Patent 315,343 suggests the use of cellulose lacquer or shellac to produce coilable flame spray material from metal powders or low melting porcelain materials. Such methods have failed to produce acceptable coatings when applied to refractory materials melting over 1000° C., such as alumina, zirconia, and chromia.

French Patent 1,323,533 teaches the formation of oxide flame spray rods of alumina, zirconia, magnesium oxide, nickel oxide, mixtures of rare earth oxides and fluorite or mixtures thereof. The binder may be shellac, dextrine, gum tragacanth, ethyl cellulose, polyvinyl alcohol, or an alginate. Such rods, although cheaper to produce than the sintered rods, have been found to produce inferior and incompletely fused coatings or to cause difficulty in clogging the spray gun adjacent the nozzle with gummy binder material.

SUMMARY OF THE INVENTION

According to the present invention, the use of highly cross-linked organic binders, in a minimal amount to fabricate rigid rods of bonded refractory particles, results in rods which are cheaper to make than the high-fired rods of the Ault patents, but which produce coatings of comparable commercial quality.

In order to spray satisfactory coatings, it has been found that the organic constituent should not exceed 30 volume percent of the bonded rods. Such rods are rigid to the extent that they cannot be coiled as is metal wire, or the prior art bonded spraying material. In order to achieve sufficient strength, the rods must contain at least 10 volume percent of bond. The modulus of rupture must be at least 3000 p.s.i. The bond must be of such a nature that it does not melt or decompose into a gummy liquid form at temperatures reached by the rod immediately prior to injection into the flame. The refractory oxide powder material should be around 100 mesh and finer (U.S. Standard sieves). It has been found that cross-linked (not-thermoplastic, infusible) polymers must be used to achieve this result. It is desirable, in most cases, to cure such bonding materials to a high degree, even to the extent of charring them. For example, when using a phenol-aldehyde bond, the cure temperature is from 190° C. to 260° C., considerably above the conventional cure temperature for such resins.

I have found that commercially available organic systems producing high temperature resistant resins which are cross-linked in structure (thermosetting) are useful. Specific resin systems found useful are phenol-aldehyde resins, epoxy novolac resins, and unsaturated polyester resin systems. Specific examples of the formulation of rods according to the present invention are as follows:

EXAMPLE I.—ALUMINA RODS

An alumina powder consisting of 26% coarser than 100 mesh and 27.5% finer than 240 mesh was mixed with a powdered partially reacted phenolic resin (including 9% by weight hexamethylene tetramine) and extruding aids, and extruded through a ¼ inch circular die. The rods were cut to 1 and 2 foot lengths, dried and cured for 14 hours at 375° F. (190° C.).

The extrusion mix and the cured rods were composed specifically of:

| | As Mixed | | After Cure | |
|---|---|---|---|---|
| | Wt. | Wt. Percent | Wt. Percent | Vol. Percent |
| Alumina blend | 1,000 | 78.4 | 93.0 | 83.2 |
| Phenolic resin (5417 Bakelite) | 75 | 5.9 | 7.0 | 16.8 |
| Carbopol 934 (thickener, B.F. Goodrich) 2% aqueous solution | 175 | 13.7 | | |
| Igipol 630 (surfactant, General Analine and Film Corp.) | 25 | 2.0 | | |

Rods of this example had a density of 3.06 g./cc. and a modulus of rupture of 6000 p.s.i. They produced good alumina flame sprayed coatings in a standard flame spray gun and did not cause clogging of the gun.

EXAMPLE II

Chromium oxide rods were prepared in a similar manner to the alumina rods of Example I.

| | Parts by Wt. in Mix | Vol. Percent Cured Rod |
|---|---|---|
| Chromia powder (through 200 mesh) | 1,000 | 75 |
| Phenolic resin powder (Bakelite 5980) | 100 | 25 |
| Carbopol 934 (3% aqueous solution, thickener) | 150 | |
| Tergitol NP27 (surfactant, Union Carbide) | 25 | |

These rods were dried and cured as in Example I. The maximum cure temperature should be between 190° and 260° C., preferably between 235° and 260° C. Instead of pure chromia, a mixture of 85% chromia and 15% siliceous glass former can be employed.

Rods thus formed had a modulus of rupture of 3300 p.s.i. For proper handling and shipping characteristics, the modulus of rupture should be at least 1000 p.s.i.

EXAMPLE III

Chromia rods were produced similarly to Example I, but instead of phenol-aldehyde resin, an unsaturated polyester type resin system was employed with a benzoyl peroxide curing agent.

The formulation was as follows:

| | Parts by wt. |
|---|---|
| Chromia powder | 1000 |
| Polyester resin V117 (Reichhold Chemical Co.) with 3% curing agent | 120 |
| Carbopol (3% aqueous solution) | 50 |
| Tergitol NP27 | 10 |

The mixture is then extruded into rods and cured at 150° C. for 45 minutes. The cure should be between 100° and 245° C. for from ½ to 1 hour.

Rods made according to this example had a volume percent resin content of 21% and a chromia powder content of 79%.

As noted above, a siliceous glass-former may be added to vary the properties of the finished coating. Siliceous glass formers up to 20% by weight may be employed.

Rods containing 15% by weight of the glass former in chromia powder formed according to the above example had a modulus of rupture of 3300 p.s.i., and produced a hard, durable coating with no difficulties caused by gumming in the gun.

What is claimed is:

1. A rigid rod for producing refractory oxide coatings by the flame spray method characterized in that the rods contain an infusible thermosetting resin binder selected from the group consisting of phenol-aldehyde resins, epoxy novolac resins and unsaturated polyester resin systems in the amount of from 10 to 30 volume percent of the total solids in the rod, have a modulus of rupture of at least 3000 p.s.i., the refractory oxide content is 100 mesh and finer, and said resin binder being cured to a high degree of cure whereby essentially no gumming decomposition products are produced in the flame spraying process to interfere with the passage of the rod through the flame spray gun.

2. A rod as in claim 1 in which the binder is a phenol-aldehyde resin in a state of cure produced at a temperature of from 190° to 260° C.

3. A rod as in claim 1 in which the binder is an infusible polyester resin in a state of cure produced at a temperature of from 100° to 245° C.

References Cited

UNITED STATES PATENTS

| 2,570,649 | 10/1951 | Davidoff. | |
|---|---|---|---|
| 2,876,121 | 3/1959 | Ault. | |
| 2,882,174 | 4/1959 | Ault. | |
| 3,171,774 | 3/1965 | Wheildon et al. | 106—57 |
| 3,329,558 | 7/1967 | Wheildon | 106—57 |

FOREIGN PATENTS 1,323,533      France.

JAMES A. SEIDLECK, Primary Examiner

R. BARON, Assistant Examiner